E. J. CAMP.
Plow.
No. 201,225. Patented March 12, 1878.
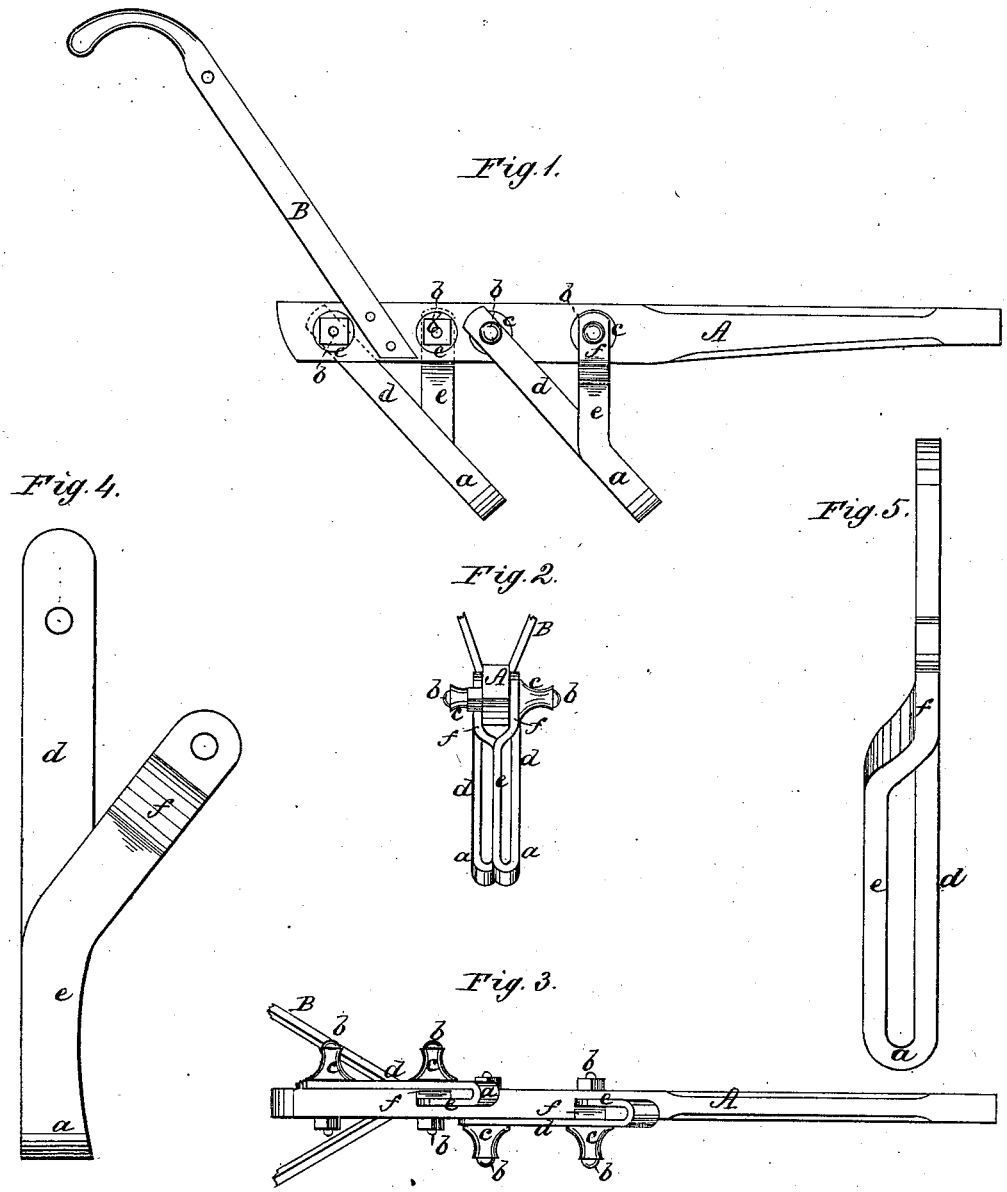
WITNESSES:
W. W. Hollingsworth
Golon C. Kenion
INVENTOR:
E. J. Camp
BY
Munn & Co.
ATTORNEYS.

UNITED STATES PATENT OFFICE.

EDMUND J. CAMP, OF ALPHARETTA, GEORGIA.

IMPROVEMENT IN PLOWS.

Specification forming part of Letters Patent No. 201,225, dated March 12, 1878; application filed February 23, 1878.

*To all whom it may concern:*

Be it known that I, EDMUND J. CAMP, of Alpharetta, in the county of Milton and State of Georgia, have invented a new and useful Improvement in Plows; and I do hereby declare that the following is a full, clear, and exact description of the same.

The invention is an improvement in the class of plows having standards, which, together with their shares or shovels, may be detached or differently adjusted to adapt the plows for breaking land with single or double furrow, or for covering and cultivating corn and other crops.

The invention is more particularly an improvement upon the plow forming the subject of Letters Patent No. 58,119, issued September 18, 1866, to F. M. McMeekin.

The invention consists in the construction and arrangement of parts hereinafter described, and particularly indicated in the claim.

I will describe my invention by reference to the accompanying drawings, forming part of this specification, in which—

Figure 1 is a side elevation; Fig. 2, a front view; Fig. 3, a bottom-plan view. Figs. 4 and 5 represent one of the standards detached.

The wooden or iron beam A and handles B may be constructed as usual heretofore in this class of plows. The standards (of which one or more may be employed) are each constructed of a single wrought-iron or other metal bar, doubled at or near the middle of its length to form a loop, $a$, and its arms or ends diverging, and having a particular form and relation, as will be hereinafter described.

The standards are attached to the beam A by means of cross-bolts $b$, on which are placed thick cylindrical washers $c$, as shown. The aforesaid loop $a$ is inclined to the beam A, to adapt it for attachment of shares or shovels. It may be slightly curved, if desired. The rear arms $d$ of the standards are preferably straight; but they may be curved forward and attached to the beam (by two or more bolts) in front of the other arm. The forward arms have two bends or angles, so that their middle portion $e$ has a nearly vertical position, and the top portion $f$ is set off or inclined laterally thereto. By means of these angles the upper ends of the forward arms are brought in line with the rear arms $b$, or into coincidence with the same vertical plane, and the standards are thereby adapted to be attached to either side of the beam, according to the kind of work to be done. Thus, for the purpose of subsoiling, in breaking up or plowing new ground, each of the standards is shifted to the opposite side of the beam, and set in with its arms in contact with the side thereof, as shown in Figs. 2 and 3, so that the bent forward arms are beneath the beam, while the rear arms remain parallel to its side.

By this adjustment the loops $a$ $a$ of the two standards are brought nearly or quite in line or in coincidence with the same vertical plane, and hence the subsoil-plow will follow in rear of the middle part of the breaking-plow.

When the plow is to be used for covering corn, or for cultivating corn or cotton, the standards are set as far apart as the length of the bolts will permit; but for plowing in wheat, oats, &c., or for breaking up, one of the standards will be set in close to the beam, and for some other uses both standards may be similarly set in.

It is obvious that one of the standards may be detached and dispensed with when desired, so that the plow can be used as a single plow, as well as a double or combination plow.

I do not claim, broadly, a plow-standard having a lateral bend or angle, and provided with an arm or brace.

The plow is simple in construction, light, strong, cheap, and adapted to wants of a large class of farmers.

What I claim is—

The plow-standard formed of a bar doubled at or near the middle of its length, the rear arm being straight or parallel to a vertical plane, and the front arm having two bends or angles, as shown and described, whereby the standards are adapted to fasten on the same side of the beam, and to be changed in position to adapt the plow for use, for the purpose specified.

EDMUND J. CAMP.

Witnesses:
AMOS W. HART,
SOLON C. KEMON.